March 21, 1944.　　T. D. CRAWFORD ET AL　　2,344,802
STEAM ENGINE VALVE MECHANISM
Filed March 25, 1942　　2 Sheets-Sheet 1
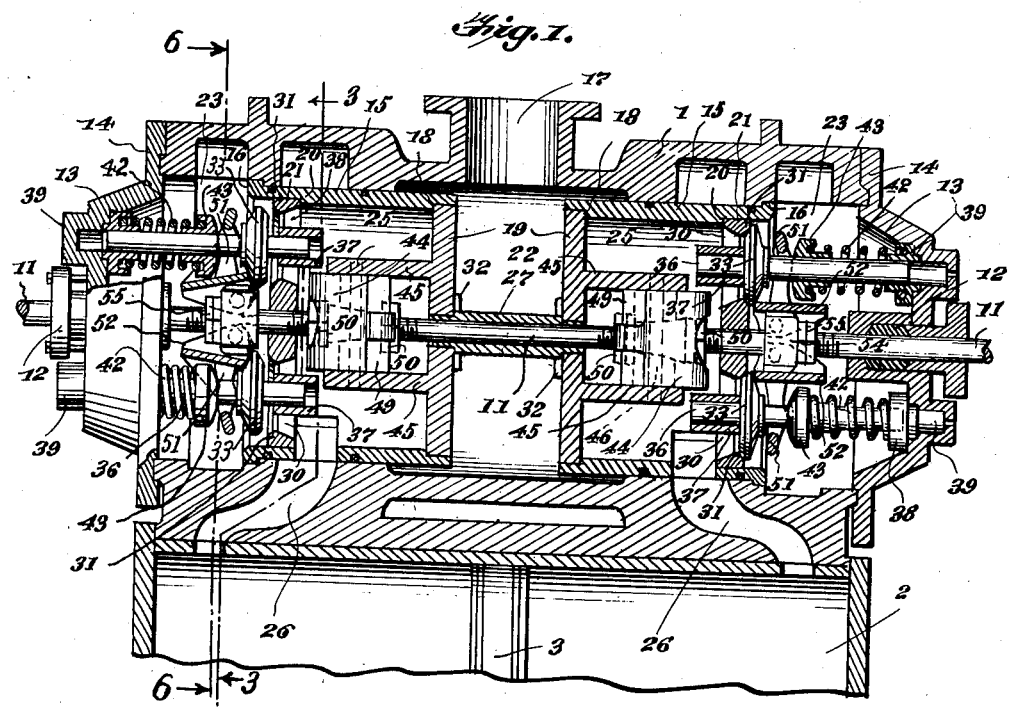
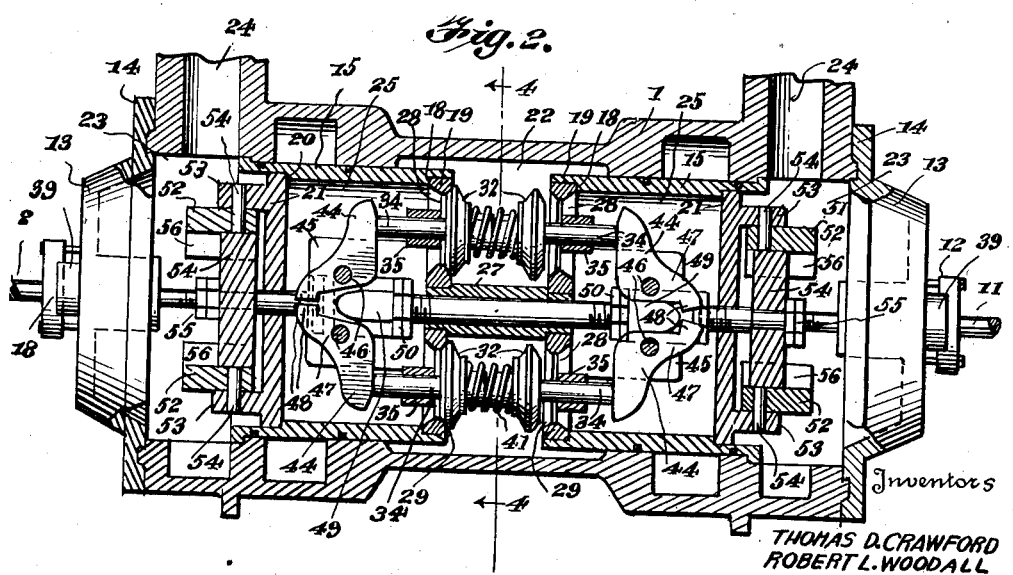
Inventors
THOMAS D. CRAWFORD
ROBERT L. WOODALL
ALGOT G. OSTERBERG
By
Attorney March 21, 1944.　　T. D. CRAWFORD ET AL　　2,344,802
STEAM ENGINE VALVE MECHANISM
Filed March 25, 1942　　2 Sheets-Sheet 2
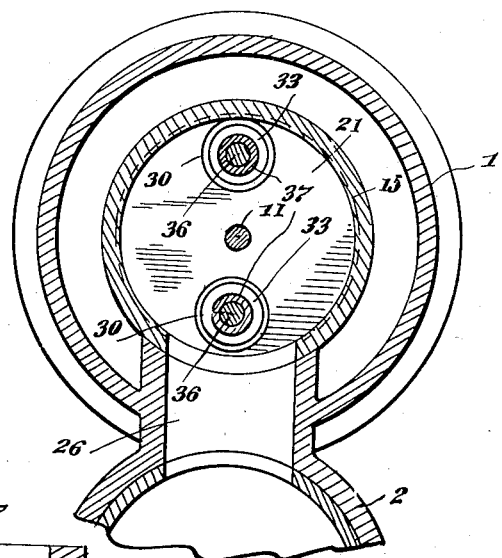
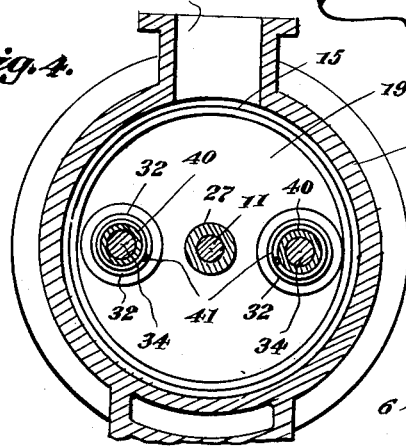
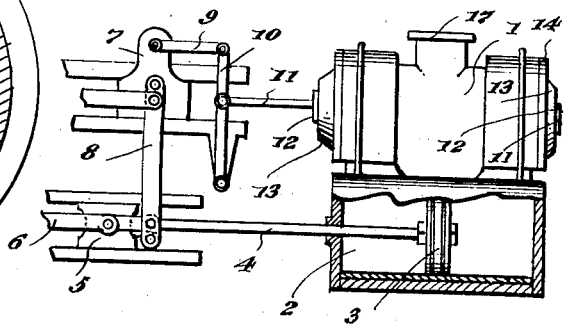
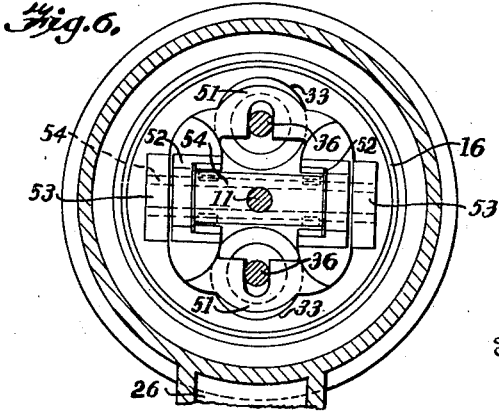
Inventors
THOMAS D. CRAWFORD
ROBERT L. WOODALL
ALGOT G. OSTERBERG
By *Woodward*
Attorney Patented Mar. 21, 1944

2,344,802

UNITED STATES PATENT OFFICE 2,344,802

STEAM ENGINE VALVE MECHANISM

Thomas D. Crawford, Robert L. Woodall, and Algot G. Osterberg, Hammond, Ind.

Application March 25, 1942, Serial No. 436,210

10 Claims. (Cl. 121—185)

This invention relates to steam engines and more particularly to a valve by means of which flow of steam into and out of a cylinder for imparting reciprocatory movement to a piston therein, is controlled.

One object of the invention is to provide a valve mechanism capable of being installed in a valve casing of conventional construction, thus eliminating the cost of a special valve casing and also permitting installation of the improved valve mechanism in lieu of valve mechanism of conventional form.

Another object of the invention is to provide a valve mechanism of such construction that the intake valves and the exhaust valves will be operated in proper timed relation to each other and in such timed relation to movements of the engine piston that steam cushions will be present in ends of the cylinder and serve as shock absorbers during reciprocation of the piston.

Another object of the invention is to provide a valve mechanism wherein cams carried by a slidable stem or rod are adjustably mounted so that opening and closing of valves actuated from these cams may be accurately timed and back pressure due to improper timing eliminated.

In the accompanying drawings:

Fig. 1 is a longitudinal sectional view taken vertically through a valve mechanism of the improved construction.

Fig. 2 is a longitudinal sectional view taken horizontally through the improved valve mechanism.

Fig. 3 is a transverse sectional view on the line 3—3 of Fig. 1.

Fig. 4 is a transverse sectional view on the line 4—4 of Fig. 1.

Fig. 5 is a side elevation of a valve casing in which the improved mechanism is mounted, a cylinder under the casing being shown in longitudinal section.

Fig. 6 is a sectional view taken along the line 6—6 of Fig. 1.

The casing 1 in which the improved valve mechanism is mounted is of conventional size and shape and is disposed over a cylinder 2 in which the piston 3 is mounted for reciprocating movement. The piston has the usual piston rod 4 which projects rearwardly from the cylinder and has its rear end connection with a slide block 5 from which the usual pitman 6 extends for transmitting rotary motion to the wheels of a locomotive engine. There has also been shown a conventional valve cross head 7 slidably mounted above the slide block 5 and connected with the outer end of the piston rod by a vertically disposed bar 8. A horizontally disposed bar 9 which is pivoted to the cross head 7, extends forwardly therefrom and has its front end pivoted to the upper end of the vertical bar 10 which is disposed forwardly of the cross head and is pivotally mounted at is lower end. This construction and arrangement of parts is illustrated in Fig. 5 and constitutes a conventional reduction gear for imparting reciprocating movement to the valve stem 11 in timed relation to movements of the piston 3 and its rod 4.

The valve operating rod 11 extends longitudinally through the valve casing 1, centrally thereof, and through packing boxes 12 at the centers of the outwardly projecting dome-shaped portions 13 of the heads 14 of the valve casing 1. The heads 14 are firmly but detachably secured in a conventional manner to ends of the valve casing and they are also packed in the usual manner to prevent leakage of steam between the heads and ends of the casing. When the heads are removed, open ends of the casing will be fully exposed and bushings or liners 15 may then be fitted into the casing through its open ends. These bushings or liners fit snugly in the casing with their outer ends spaced inwardly from ends of the casing and formed with flanges 16 for engaging annular shoulders in the casing and limiting inward movement of the bushings when thrust into place. Inner ends of the bushings terminate at opposite sides of the steam inlet 17 and are internally recessed to form seats for heads 19. Outer portions of the bushings are also internally recessed to form seats 20 for receiving heads 21 and, referring to Figs. 1 and 2, it will be seen that the heads 19 and 21 constitute partitions dividing the casing into a central steam chamber 22, exhaust chambers 23 from which the exhaust pipes 24 lead, and intermediate chambers 25 which may be termed port chambers, as the steam passes through these chambers into and out of the cylinder 2 through the ports 26. A sleeve 27 extends between the heads 19 with its ends seated in openings formed centrally of the heads and this sleeve serves as a guide for the valve operating rod 11 as it reciprocates through the heads.

Each of the inner heads or partitions 19 is formed with openings 28 having walls beveled to form valve seats 29 and each outer head or partition 21 is formed with openings 30 having their walls beveled to form valve seats 31. The valves 32 which cooperate with the passages 28 and their seats 29, control flow of incoming steam and the valves 33 which cooperate with the openings 30 and their seats 31, control flow of exhausting steam. The stems 34 of the valves 32 are slidably mounted through sleeves 35 mounted centrally of the openings 28 and the valves 33 have longer stems 36 having their inner portions slidably mounted through sleeves 37 and their outer end portions slidably mounted through tubular spring seats 38 mounted in pockets 39 carried by and extending outwardly from the domes 13 of the heads 14. The inner portions of the stems 34 are slidably received through sleeves 40 and about these sleeves are springs 41 urging the valves 32 toward the valve seats 29 and yieldably holding these valves closed. The valves 33 are urged toward a closed position by springs 42 coiled about the stems 36 and having their outer ends seated in cup-shaped collars 43 carried by the stems. By adjusting the collars along the stems, tension of the springs can be controlled and opening and closing of the valves regulated. It will thus be seen that the inlet valves 32 and the exhaust valves 33 will be yieldably held in their normally closed positions and that by properly timed opening and closing of the valves, flow of steam through the valve casing 1 into and out of the cylinder 2, may be controlled to effect reciprocating movement of the piston 3 and its piston rod 11.

In order to shift the inlet valves 32 to open position, there have been provided tappets 44. These tappets are arranged in pairs and pivotally mounted between plates 45 carried by the inner heads or partitions 19 and projecting therefrom into the port chambers 25. The tappets extend transversely of the plates with their outer end portions projecting from the plates and bearing against outer ends of the stems 34 of the valves 32. When the tappets are tilted about their pivots 46 from the position shown at the left of Fig. 2, to the position at the right of this figure, the valves will be shifted to open position and when the tappets return to their normal position the valves will be closed. Closing of the valves and return of the tappets to their normal position is effected by expansion of the springs 41. The tappets of each pair have their inner ends spaced from each other and formed with outwardly extending arms 47 having lugs 48 at their ends for engaging each other and limiting tilting of the tappets about their pivots as the valves close. Cam blocks 49 are carried by the rod 11 between the plates 45 and when the rod is shifted longitudinally back and forth, the blocks or cams will alternately be moved into position between the companion tappets to tilt these tappets about their pivots in a direction to apply pressure upon outer ends of the valve stems 34 and shift the valves of these stems to open position. Since the cam blocks are secured by nuts 50 threaded upon the rod 11 and engage opposite ends of the blocks, they may be shifted along the rod to adjusted positions and accurate timing for opening and closing of the valves obtained.

When a set of valves 32 are opened, steam flows from the steam chamber through openings 28 into the port chamber 25 with which these openings communicate and then flows through the port 26 leading from this port chamber into an end portion of the cylinder 2, where it expands and moves the piston 3 longitudinally in the cylinder. Steam in the cylinder at the opposite side or end of the piston will be forced outwardly through the port 26 leading from this end of the cylinder and into the other port chamber 25 from which it is to flow into the adjoining exhaust chamber 23 and out through the pipe 24 to the stack of a locomotive engine. The springs 42 yieldably hold the valves 33 closed and, in order that these valves may be mechanically locked against premature opening, there have been provided levers 51 which straddle the valve stems 36 between the valves 33 and the collars 43. These levers are carried by plates 52 which are pivoted to ears 53 of the partitions 21 by pins 54' and, from an inspection of Fig. 1, it will be seen that when the plates 52 and their levers 51 are held stationary, the valves 33 cannot be opened. The rod 11 carries blocks 54 held in place by nuts 55 and so positioned on the rod that when they are in the position shown at the right of Figs. 1 and 2, they project outwardly beyond the pivots 54' a sufficient distance to prevent tilting of the latching levers in a direction for opening of the valves 33. When the rod 11 is shifted longitudinally to dispose the blocks 54 in the position shown at the left of Figs. 1 and 2, they still bear against the flanges 56 of the plates 52 but are so disposed relative to the pivot pins 54' that the plates may tilt about the pins. Therefore, the levers 51 may swing outwardly and the valves open. By properly adjusting the blocks upon the rod 11, opening of the valves 33 may be so timed that steam will be held in the end portion of the cylinder toward which the piston is moving and form a steam cushion to prevent pounding.

The operation of the improved valve mechanism is as follows:

Steam enters the steam chamber 22 through the inlet neck 17 and from this central steam chamber the steam will flow through the uncovered openings 28 into the port chamber 25 with which the uncovered openings or ports communicate. From this port chamber, the steam flows through the communicating port 26 into an end portion of the cylinder 2 to act upon the piston 3 and impart movement to the piston and its piston rod 4. As the piston moves toward the rear end of the cylinder, steam in the rear portion of the cylinder is forced out through the port 26 leading therefrom into the rear port chamber 25 which is shut off from the central steam chamber by the closed rear valves 32. The inlet valves 32 are mechanically opened by the tappets 44 and, during flow of steam into the front port chamber and the front end of the cylinder, only the front valves 32 will be opened by action of the companion tappets and block 49. Since the rear inlet valves 32 remain closed steam will be prevented from flowing from the central steam chamber into the rear port chamber and back pressure on the piston will be prevented. If the springs 42 did not close the exhaust valves, the sliding block in the locking device would force the valves closed as the fingers of the locking device rest on top of the valves which holds them securely locked. Escape of steam from the front end of the cylinder through the front port chamber and the front exhaust chamber is prevented as the front block 52 holds the front levers 51 stationary and steam pressure cannot open the front exhaust valves 33. As the piston moves rearwardly, steam in the rear portion of the cylinder is forced through the rear port 26 into the rear port chamber 25. In this improved valve the piston travels two and one-half inches when the exhaust valves on exhaust end are completely unlocked and as soon as the exhaust pressure rises slightly above the required pressure of the springs, the excess pressure forces the valves open and the exhausting steam is forced into the exhaust chamber and out through the stack. The front inlet valves reach their greatest opening when the piston is midway its back stroke. After the piston reaches the end of its rearward movement, the rod 11 returns to a central position and the forward exhaust valves are released, and the rear exhaust valves locked in closed position. At the same time, the front inlet valves are closed and the rear inlet valves begin to open. Steam will then flow from the central steam chamber into the rear port chamber and from this chamber into the rear end portion of the cylinder to check rearward movement of the piston by a steam cushion and then cause the piston to move forwardly. Since the piston 3 and its rod 4 are connected with the cam rod 11 by the reduction mechanism shown in Fig. 5, the piston and the cam rod will move in properly timed relation to each other and opening and closing of the inlet valves and the exhaust valves take place in such timed relation to movement of the piston toward ends of the cylinder that reversal of movement of the piston takes place without pounding. Since the cams 49 and the locking blocks are adjustably mounted upon the rod 11, accurate control of opening and closing of the valves may be obtained and the valve mechanism will operate very smoothly. By removing the heads 14, the bushings and valve mechanism carried thereby may be withdrawn and cleaning and adjustment or repairs performed.

Having thus described the invention, what is claimed is:

1. In a steam engine valve mechanism including a cylinder, a valve casing extending longitudinally of the cylinder, and a piston in the cylinder having a piston rod projecting from one end thereof; bushings fitting within the valve casing with their inner ends spaced from each other and their outer ends spaced from ends of the casing, the bushings having inner and outer heads and dividing the casing into a central steam chamber, exhaust chambers between the bushings and ends of the casing, and port chambers within the bushings, heads closing front and rear ends of said valve casing, the casing having a steam inlet communicating with the central steam chamber and exhaust outlets leading from the exhaust chambers, there being ports establishing communication between the port chambers and opposite ends of the cylinder, a valve actuating rod extending longitudinally through the casing with its rear end portion protruding from the rear head of the casing, means for connecting the rear end of the valve rod with the rear end portion of the piston rod and imparting reciprocating movement to the valve rod in timed relation to reciprocating movement of the piston rod, the inner and outer heads of the bushings being formed with steam passages having valve seats about their outer ends, inlet valves slidably mounted in the central chamber and yieldably held in closed position against the valve seats of the inner heads and having stems projecting into the port chambers, outlet valves in the exhaust chambers yieldably held in closed position against valve seats of the outer heads, tappets pivotally mounted in the port chambers engaging stems of the inlet valves, cams carried by the valve operating rod for tilting the tappets in a direction to open the inlet valves when the valve rod is shifted longitudinally, plates pivotally mounted in the exhaust chambers and having lever arms engaging the outlet valves to prevent opening movement of said outlet valves when the plates are held against tilting movement, and locking blocks carried by the valve operating rod and movable therewith into and out of position to prevent tilting movement of the plates in a direction permitting opening of the outlet valves.

2. In a steam engine valve mechanism including a cylinder, a piston in the cylinder having a piston rod protruding from one end of the cylinder, and a cylindrical valve casing extending longitudinally of the cylinder and formed with a central steam inlet and with exhaust outlets at its ends, there being ports establishing communication between the casing and opposite ends of the cylinder; removable heads closing ends of the valve casing, bushings fitted snugly within the casing through ends thereof and having inner and outer heads formed with steam passages and constituting partitions dividing the casing into a central steam chamber and exhaust chambers, space within the bushings between their inner and outer heads constituting intermediate port chambers having communication with ends of the cylinder through the ports of the cylinder, a valve actuating rod extending longitudinally through the valve casing and the chambers thereof, outwardly opening valves for closing the passages of the inner heads, outwardly opening valves for closing the passages of the outer heads, said valves being yieldably held closed, tappets for opening valves of the inner head, cams carried by the valve rod for moving the tappets in a valve-opening direction, pivoted latches for holding the valves of the outer heads closed, and abutments carried by the valve rod and movable therewith into and out of position for holding the latches stationary with the valves of the outer head closed.

3. In a steam engine valve mechanism including a cylinder, a piston in the cylinder having a piston rod protruding from one end of the cylinder, and a cylindrical valve casing extending longitudinally of the cylinder and formed with a central steam inlet and with exhaust outlets at its ends, there being ports establishing communication between the casing and opposite ends of the cylinder; removable heads closing ends of the valve casing, bushings fitted snugly within the casing through ends thereof and having inner and outer heads formed with steam passages and constituting partitions dividing the casing into a central steam chamber and exhaust chambers, space within the bushings between their inner and outer heads constituting intermediate port chambers having communication with ends of the cylinder through the ports of the cylinder, a valve actuating rod extending longitudinally through the valve casing and the chambers thereof, outwardly opening valves for closing the passages of the inner heads yieldably held closed and having stems extending into the port chambers, plates from the inner heads into the port chambers, tappets pivotally carried by said plates and engaging the valve stems, cams carried by the valve rod for tilting the tappets in a valve-opening direction, outwardly opening valves for the passages of the outer heads, latches for holding the valves of the outer heads closed movably mounted in the exhaust chambers, and abutments carried by the valve rod and movable therewith into and out of position for holding the latches stationary with the valves of the outer heads closed.

4. In a steam engine valve mechanism including a cylinder, a piston in the cylinder having a piston rod protruding from one end of the cylinder, and a cylindrical valve casing extending longitudinally of the cylinder and formed with a central steam inlet and with exhaust outlets at its ends, there being ports establishing communication between the casing and opposite ends of the cylinder; removable heads closing ends of the valve casing, bushings fitted snugly within the casing through ends thereof and having inner and outer heads formed with steam passages and constituting partitions dividing the casing into a central steam chamber and exhaust chambers, spaced within the bushings between their inner and outer heads constituting intermediate port chambers having communication with ends of the cylinder through the ports of the cylinder, a valve actuating rod extending longitudinally through the valve casing and the chambers thereof, outwardly opening valves for closing the passages of the inner heads yieldably held closed and having stems extending into the port chambers, valve-opening members mounted in the port chambers and engaging the valve stems, actuating members for the valve-opening members carried by the valve rod, outwardly opening outlet valves for the passages of the outer heads having stems slidable longitudinally in the exhaust chambers, collars carried by the stems of the outlet valves, springs engaging said collars and yieldably holding the outlet valves closed, mounting members in the exhaust chambers carried by the outer heads, latches for holding the outlet valves closed consisting of plates pivoted to the mounting members and arms extending from the plates and engaged between the collars and the outlet valves, and abutment members carried by the valve rod and movable therewith into and out of position for blocking movement of the plates and thereby holding the latches in position to retain the outlet valves closed.

5. In a steam engine valve mechanism including a cylinder, a piston in the cylinder having a piston rod protruding from an end of the cylinder, and a cylindrical valve casing having a central steam inlet and exhaust outlets at its ends, there being ports between the casing and opposite ends of the cylinder; removable heads closing ends of the casing, bushings fitted into the casing through opposite ends thereof and having inner and outer heads formed with steam passages, the bushings and their heads dividing the casing into a central steam chamber and exhaust chambers at ends of the casing and port chambers within the bushings communicating with the ports leading to ends of the cylinder, a valve rod extending longitudinally through the casing and its chambers and connected with the piston rod for reciprocation in timed relation to reciprocation of the piston rod, inlet valves for closing passages of the inner heads, means actuated from the valve rod for opening the inlet valves, outlet valves for closing the passages of the outer heads yieldably held closed, latches for holding the outlet valves closed movable with the outlet valves, and means moving with the valve rod into and out of position for holding the latches stationary with the outlet valves closed.

6. In a steam engine valve mechanism including a cylinder, a piston in the cylinder having a piston rod protruding from an end of the cylinder, and a cylindrical valve casing having a central steam inlet and exhaust outlets at its ends, there being ports between the casing and opposite ends of the cylinder; removable heads closing ends of the casing, hollow partitions dividing the casing into a central steam chamber and exhaust chambers and defining port chambers between the exhaust chambers and the steam chamber having communication with ends of the cylinder through said ports, the partitions having inner heads formed with inlet openings for incoming steam and outer heads formed with outlet openings for exhaust steam, a valve rod extending longitudinally through said casing and reciprocated in timed relation to reciprocating movement of the piston rod, valves for the inlet openings yieldably held closed, means for opening the inlet valves actuated from the valve rod, valves for closing the outlet openings, said valves being yieldably held closed and opened by pressure of exhausting steam, latches for the outlet valves, and means moving with the valve rod into and out of position for holding the latches in position to maintain the outlet valves closed.

7. In a steam engine valve mechanism including a cylinder, a piston in the cylinder having a piston rod protruding from an end of the cylinder, and a cylindrical valve casing having a central steam inlet and exhaust outlets at its ends, there being ports between the casing and opposite ends of the cylinder; removable heads closing ends of the casing, hollow partitions dividing the casing into a central steam chamber and exhaust chambers and defining port chambers between the exhaust chambers and the steam chamber having communication with ends of the cylinder through said ports, the partitions having inner heads formed with inlet openings for incoming steam and outer heads formed with outlet openings for exhaust steam, a valve rod extending longitudinally through the casing and reciprocated in timed relation to reciprocating movement of the piston rod, valves for the inlet openings yieldably held closed, said valves having stems extending into the port chambers, bearing plates extending from the inner heads into the port chambers, pairs of tappets pivoted to the bearing plates in spaced relation to each other and engaging ends of the valve stems, said tappets having arms provided with abutment lugs, cams carried by the valve rod and extending between the tappets for acting upon their arms and tilting the tappets to open the inlet valves during reciprocation of the valve rod, valves for the outlet openings yieldably held closed and movable outwardly to open position by pressure of exhausting steam, and means actuated from the valve rod for controlling opening of the outlet valves.

8. In a steam engine valve mechanism including a cylinder, a piston in the cylinder having a piston rod protruding from an end of the cylinder, and a cylindrical valve casing having a central steam inlet and exhaust outlets at its ends, there being ports between the casing and opposite ends of the cylinder; removable heads closing ends of the casing, hollow partitions dividing the casing into a central steam chamber and exhaust chambers and defining port chambers between the exhaust chambers and the steam chamber having communication with ends of the cylinder through said ports, the partitions having inner heads formed with inlet openings for incoming steam and outer heads formed with outlet openings for exhaust steam, a valve rod extending longitudinally through said casing and reciprocated in time relation to reciprocating movement of the piston rod, valves for the inlet openings yieldably held closed, means for opening the inlet valves actuated from the valve rod, valves for closing the outlet openings movable outwardly to open position by exhausting steam and having stems extending longitudinally through the exhaust chambers and slidably mounted, collars carried by the valve stems, spring seats surrounding the valve stems and carried by the casing heads, springs about the valve stems abutting the spring seats and said collars and yieldably holding the outlet valves closed, mounting members carried by the outer heads and extending into the exhaust chambers, latches consisting of plates pivotally carried by the mounting members at opposite sides of the valve rod and arms extending from the plates and straddling the valve stems between the collars and the outlet valves, and blocks carried by the valve rod between the plates and movable with the valve rod into and out of position to prevent tilting of the plates and hold the latches stationary with their arms bearing against the outlet valves and holding said valves closed.

9. In a steam engine valve mechanism including a cylinder, a piston in the cylinder having a piston rod protruding from an end of the cylinder, and a cylindrical valve casing having a central steam inlet and exhaust outlets at its ends, there being ports between the casing and opposite ends of the cylinder; removable heads closing ends of the casing, partitions in the casing spaced from each other and dividing the casing into a central steam chamber and exhaust chambers and port chambers between the steam chamber and the exhaust chambers, inner ones of the partitions being formed with inlet openings and the outer partitions having outlet openings formed therein, a valve rod extending longitudinally through the casing and reciprocated in timed relation to reciprocation of the piston rod, valves for the inlet openings yieldably held closed, means actuated from the valve rod for periodically opening the inlet valves during reciprocation of the valve rod, valves for the outlet openings yieldably closed and adapted to be opened by exhausting steam, latches for holding the outlet valves closed, and means moving with the valve rod into and out of position for holding the latches in position to maintain the outlet valves closed.

10. In a steam engine valve mechanism including a cylinder, a piston in the cylinder having a piston rod protruding from an end of the cylinder, and a cylindrical valve casing having a central steam inlet and exhaust outlets at its ends, there being ports between the casing and opposite ends of the cylinder; removable heads closing ends of the casing, partitions in the casing spaced from each other and dividing the casing into a central steam chamber and exhaust chambers and port chambers between the steam chamber and the exhaust chambers, inner ones of the partitions being formed with inlet openings and the outer partitions having outlet openings formed therein, a valve rod extending longitudinally through the casing and reciprocated in timed relation to reciprocation of the piston rod, valves for the inlet openings operating in the steam chamber and yieldably held closed, tappets mounted in the port chambers, cams carried by the valve rod for actuating the tappets and periodically effecting opening of the inlet valves during reciprocation of the valve rod, outlet valves for the outlet openings operating in the exhaust chambers and yieldably held closed, latches in the exhaust chambers movable into and out of position to hold the outlet valves closed, and means moving with the valve rod into and out of position to hold the latches stationary and the outlet valves closed.

THOMAS D. CRAWFORD.
ROBERT L. WOODALL.
ALGOT G. OSTERBERG.